C. H. Griffin,
Shoe-Sole Machine,
No. 1,610 Reissued Jan. 26, 1864
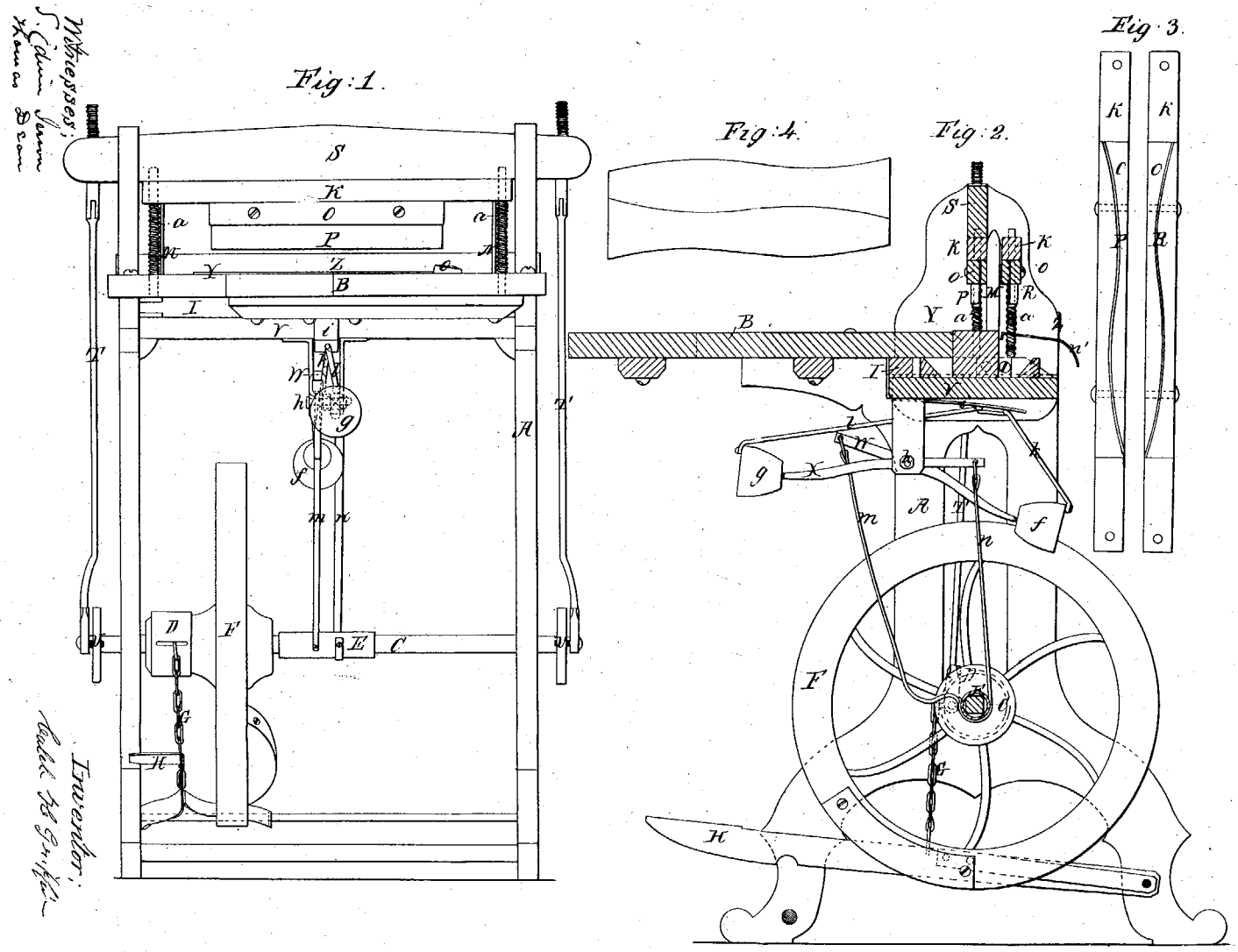
Witnesses;
S. Edwin Jerrin
Thomas Dean
Inventor;
Caleb H. Griffin

UNITED STATES PATENT OFFICE.

CALEB H. GRIFFIN, OF LYNN, MASSACHUSETTS, ASSIGNOR, BY MESNE ASSIGNMENTS, TO DAVID KNOX AND WALTER D. RICHARDS, BOTH OF SAME PLACE.

IMPROVEMENT IN MACHINES FOR CUTTING OUT BOOT AND SHOE SOLES.

Specification forming part of Letters Patent No. 13,072, dated June 12, 1855; Reissue No. 1,610, dated January 26, 1864.

*To all whom it may concern:*

Be it known that I, CALEB HENRY GRIFFIN, of Lynn, in the county of Essex and State of Massachusetts, have invented a new and useful Improvement in Machinery for Cutting out Boot and Shoe Soles from Leather; and I do hereby declare that the same is fully described and represented in the following specification and the accompanying drawings, letters, figures, and references thereof.

Of the said drawings, Figure 1 denotes a front elevation of one of my improved sole cutting machines. Fig. 2 is a central, vertical, and longitudinal section of it, the same being taken a little to the right of the middle of the machine, and for the purpose of clearly exhibiting the mechanism by which the reciprocating knife-frame is operated. Fig. 3 is an under side view of the two knives, their holding-stocks, and the bars thereof, all of which will be hereinafter described.

In Figs. 1 and 2 of the drawings, A represents the main frame of the machine, such being provided with a table or platform, B, extended across the frame, and sustained in suitable boxes is a driving shaft, C, such shaft having two barrels or pulleys, D and E, and a fly-wheel, F, fixed to it or arranged on it, as seen in the drawings. To the periphery of the barrel D one end of a chain, G, is attached, the other end thereof being connected to a foot-treadle or lever, H. Underneath the table or board B is a carriage or sliding frame, I, which is applied to the table so as to be capable of being moved in a longitudinal direction. From each end of this carriage and up through a slot formed through the table two posts or standards, *a a*, are made to rise and respectively to have springs coiled around them. Resting on these springs are two parallel bars, K K, which extend transversely across the machine, as seen in Figs. 1 and 2, each being made to receive through it two of the rods *a a* and to slide freely thereon. Between the two bars K K, and near each two adjacent ends of the same, such bars may be provided with guides or posts M N, for maintaining them at proper distances apart, such posts being made to extend up from the carriage.

Each of the bars K carries on its under side a cutter-stock, O, from which projects a curved knife, P, or R, (see Figs. 1, 2, 3,) the two knives being formed and arranged with respect to each other as shown in the said figures.

Directly above the knife-bars K K the frame A is provided with a depressor-bar, S, which should be so applied to the said frame as to be capable of being freely moved up or down in a vertical plane. The said depressor-bar is supported on and jointed to the upper ends of two connecting-rods, T T, whose lower ends are jointed to wrists or clank wheels U U, fixed on the outer ends of the driving-shaft, as seen in Fig. 1. When a reciprocating rotary motion is imparted to the shaft by means of the treadle, a reciprocating vertical motion will be given to the depressor-bar. Below a cross-bar, V, of the frame of the machine are two weighted levers, W and X, which are arranged and provided with weights *f g*, and made to turn on a fulcrum, *h*, as seen in Figs. 1 and 2. To the middle of a bent bar, *i*, attached to the frame I, the ends of two straps or bands, K *l*, are fastened, the other ends of such bands being respectively connected to the weights and the levers. Two other straps, *m n*, are respectively attached to the shorter arms of the levers, and at their lower ends such straps are fastened to the periphery or outer curved surface of the barrel E, one strap being wound around the periphery while the other is unwound therefrom.

Below the two knives the table is provided with a cutter-block, Y, down upon which the cutting-edges of the knives are brought alternately when cutting a strip of leather into soles. Parallel to the outer edge of the block and at a proper distance from it is a stop or gage-bar, Z, against which the leather is borne whenever it is moved forward underneath the cutters, the soles separated from it dropping down upon and being discharged from the machine by a curved apron or chute, *n'*, arranged as seen in Fig. 2.

In operating the machine, the attendant places his foot on the treadle and sets it in movement up and down, so as to impart to the driving-shaft a reciprocating rotary motion, he at the same time holding a strip of leather on the top surface of the table and against a guide-bar, *o*, fixed thereon. From time to time, or as occasion may require, he moves the said strip forward against the stop or gage bar. The frame or carriage I will have an intermittent reciprocating motion imparted to it, which will carry each of the knife-bars K K in succession directly underneath the depressor-bar, which, descending thereupon, will force the knife-bar and its knife downward toward the cutter-block, and so as to cause the knife to cut through the leather thereon, such knife being forced from the leather back to its place immediately after each cut by the springs on the rods that guide its bar K K downward, and thus each stroke of each knife cuts the corresponding sides of two soles, heel to toe, so that no waste of leather is effected in the operation.

By means of my machine the strip of leather will be cut into sole-blanks, as seen in Fig. 4.

In the sole-cutting machines hitherto patented the mechanism for moving the knives is either so ponderous as to render them ineffectual for quick and continuous operation, or, as in the case of the patent granted to Richard Richards, dated December 16, 1854, so complicated and uncertain in its action as to be equally impracticable for rapid working, and my present improvement consists in so constructing a machine that the knives shall be carried by a positive and certain mechanism to and from the cutting-point, one knife cutting the right, and the other the left, side of the sole, and so on alternately, and the knife that has performed its function being carried back to its starting-point while the other is descending to cut, thus effecting a great economy in time and material in its operation.

Having now described my invention, what I claim, and desire to secure by Letters Patent, is—

1. The combination of the depressor-bar with the reciprocating knife-frame, its two movable knives and their elevating-springs or equivalent machinery, such being arranged and made to operate together substantially as specified.

2. So constructing a machine with two knives, each connected to a separate cutter-head, and with their edges toward the surface to be cut, that by the mechanism employed said knives shall be brought alternately to the cutting-point, the one ascending as the other descends, the one cutting the right and the other the left side of the sole, and so on alternately in the manner described, and for the purposes set forth.

CALEB H. GRIFFIN.

Witnesses:
THOMAS DEAN,
S. EDWARD IRESON.